May 27, 1924.  1,495,964

J. REID

VALVE

Filed July 19, 1921

INVENTOR
James Reid
BY
Denison Thompson
ATTORNEYS

Patented May 27, 1924.

1,495,964

UNITED STATES PATENT OFFICE.

JAMES REID, OF SYRACUSE, NEW YORK, ASSIGNOR TO PIERCE, BUTLER & PIERCE MFG. CORP., OF EASTWOOD, NEW YORK, A CORPORATION OF NEW YORK.

VALVE.

Application filed July 19, 1921. Serial No. 485,797.

*To all whom it may concern:*

Be it known that I, JAMES REID, of Syracuse, in the county of Onondaga, in the State of New York, have invented new and useful Improvements in Valves, of which the following, taken in connection with the accompanying drawings, is a full, clear, and exact description.

This invention relates to certain improvements in valves, and particularly to a valve for controlling the flow of high pressure steam.

Valves utilized for the purpose described are usually subjected to high temperature which renders the valve parts more easily susceptible to deformation and distortion when subjected to the high pressure necessary to close the valve and maintain the same in that position.

The main object of this invention is to provide a valve structure embodying a positive double shut-off so arranged that the excessive pressure necessary to close the valve will not be transmitted to the housing or body of the valve, and strain them out of working condition or interfere with the proper seating of the valve disk.

Other objects and advantages relate to the details of construction of the device, all as will more fully appear from the following description, taken in connection with the accompanying drawing, in which.

The valve structure as shown, comprises a body —1— having a transverse wall —2—, formed with an opening therethrough surrounded by a threaded wall having an underlying flange, upon which the valve seat —3— is adapted to rest when screwed into said threaded wall. Any suitable means may be provided for locking the valve seat against rotation with respect to the transverse wall —2— and for that purpose a set screw —4— is shown, or other suitable means may be substituted, should that be desirable.

Figure 1:
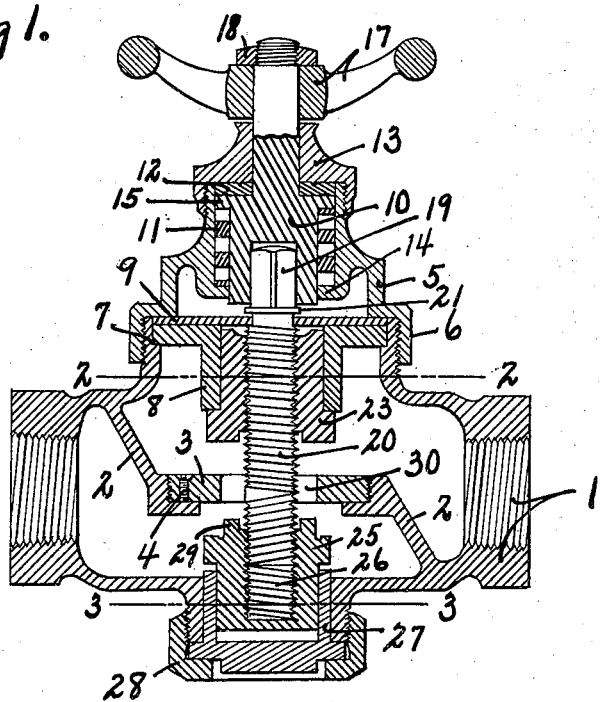
Figure 1 is a sectional view of the valve structure.
Figure 2:
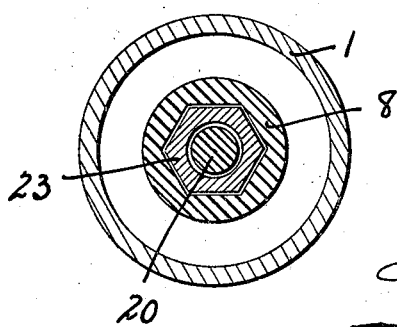
Figure 2 is a section on line 2—2, Figure 1.
Figure 3:
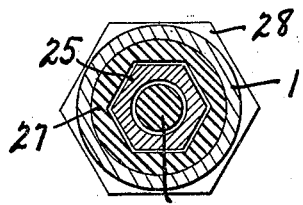
Figure 3 is a section on line 3—3, Figure 1.
Figure 4:
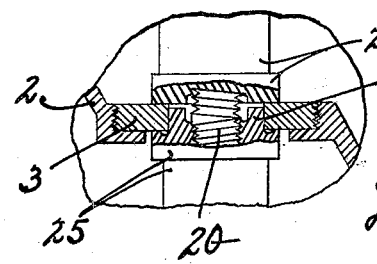
Figure 4 is a fragmentary view showing the valve disks in closed position.

The body 1 carries a bonnet —5— which may, as shown, have an internally threaded flange —6— telescoped externally with a portion of the body and having a threaded relation therewith. The body adjacent the bonnet is provided with a recess —7— within which is seated a top guide sleeve —8— and upon the guide nut is a split stem retaining plate —9—, the edge of the guide nut and the retaining plate being confined between the body —1— and the bonnet —5—, as shown in Figure 1.

The bonnet —5— carries a socket stem —10— held in working position by spring —11—, which spring likewise tends to tightly confine the packing —12— between the top cap —13— for the bonnet and the socket stem —10—, and as shown, this top cap may have a flange telescoped externally with the upper end of the bonnet and having a threaded relation therewith, the spring being confined between the flange —14— upon the bonnet —5— and the flange —15— upon the socket stem —10—. The socket stem —10— is adapted to be rotated by a hand wheel —17— held in operative position by jamb nut —18—. The socket stem —10— has an angular recess in its lower end for the reception of the upper angular end portion —19— of a valve-actuating screw or threaded stem —20— having a flange —21— positioned between the socket stem —10— and the split retaining plate —9— and capable of a limited vertical movement between said parts to permit a tight setting of both of the valve disks. The top guide sleeve —8— carries a valve disk —23— of angular exterior conformation to fit the angular opening in the guide sleeve —8— and this prevents rotation of the valve disk with respect to the guide sleeve and causes longitudinal movement of the disk along the clamping screw when the latter is rotated. The lower end of the clamping screw is provided with a thread opposite in direction to the thread engaged with the disk —23— and this lower portion of the stem has a threaded relation with a valve disk —25— which has a threaded recess —26— adapted to receive the stem —20— so that rotation of the stem —20— causes movement of the disks —23— and —25— toward each other and toward their engaging position with the valve seat —3—. The disk —25— is guided and held from rotation by a bottom guide sleeve —27— mounted in the body —1— and held in desired position by a bottom clamping nut —28—. The disk —25— is provided with an upwardly extending projection or flange —29— adapted to fit within the opening —30— through the valve seat —3— and substantially close said opening so that the flow of steam is retarded by this projection until the body of the disk itself is moved a considerable distance from its seat. This construction tends to lessen the wearing or cutting of the face of the upper valve disk by allowing it to be drawn away from the valve seat before a full flow of steam can strike it.

From consideration of the above, it will be readily apparent that the body of the valve is not strained in any way while under high temperature by the power required to close the valve.

Although I have shown and described a specific construction of a device as illustrative of a perhaps preferred embodiment of my invention, I do not desire to limit myself to the details of construction, form or arrangement of the valve structure, as various changes may be made in the same without departing from the invention as set forth in the appended claims.

I claim:

1. A valve comprising a body having a valve seat with an opening therethrough, a valve-actuating stem extending thru said opening and having portions upon opposite sides of said valve seat threaded in opposite directions, valves positioned upon opposite sides of said seat and having a threaded relation respectively with the oppositely threaded portions of said stem, means for preventing rotation of said valves, a bonnet secured to the body, a socket stem for rotating the valve-actuating stem and having a portion within the bonnet, a top cap secured to the upper end of the bonnet and having an opening for the valve stem, a packing ring between the socket stem and the top cap and spring means for maintaining the socket stem in contact with said packing.

2. A valve comprising a body, a valve seat in connection with the body, a valve-actuating stem, a pair of valves having a threaded relation with said stem and adapted to be simultaneously moved toward opposite sides of said seat upon rotary movement of said stem, and means permitting limited longitudinal movement of said stem to permit said stem to automatically adjust itself so that each valve is drawn tightly to its seat.

3. A valve comprising a body having a valve seat with an opening therethrough, a valve-actuating stem extending thru said opening and having portions upon opposite sides of said valve seat threaded in opposite directions, valves positioned upon opposite sides of said seat and having a threaded relation respectively with the oppositely threaded portions of said stem, means for preventing rotation of said valves, a bonnet secured to the body, a socket stem for rotating the valve-actuating stem, and a spring interposed between the bonnet and the socket stem.

4. A valve comprising a body having a valve seat with an opening therethrough, a valve-actuating stem extending thru said opening and having portions upon opposite sides of said valve seat threaded in opposite directions, valves positioned upon opposite sides of said seat and having a threaded relation respectively with the oppositely threaded portions of said stem, means for preventing rotation of said valves, a bonnet secured to the body, a socket stem for rotating the valve-actuating stem a spring interposed between the bonnet and the socket stem, a top cap secured to the bonnet and having an opening through which a portion of the socket stem extends, and a packing interposed between the socket stem and the top cap.

5. A valve comprising a body, a valve seat having a passageway therethrough, a pair of valves disposed upon opposite sides of said seat, a screw having a right hand thread engaged with one of said valves and a left hand thread engaged with the other of said valves for simultaneously moving said valves toward said seat upon rotation of the screw, a socket stem for rotating said screw, a retaining plate for holding said screw in normal working position, and a flange on the screw positioned between the socket stem and the retaining plate and having a limited movement between said members to permit automatic adjustment of the stem for tightly closing both valves.

6. A valve comprising a body, a valve seat in connection with the body, a pair of valves adapted to be simultaneously moved into contact with opposite sides of said seat, and a guide sleeve in connection with each of said valves for preventing rotation of the valves.

7. A valve comprising a body, a valve seat having a passageway therethrough, a pair of valves simultaneously moved into contact with opposite sides of said seat, one of said valves having a flange projecting into said passageway when the valve is brought into contact with said seat.

8. A valve comprising a body, a valve seat having a passageway therethrough, a pair of valves disposed upon opposite sides of said seat, a screw projecting through said passageway and adapted to simultaneously move said valve into contact with said seat, one of said valves having a projecting flange substantially closing said passageway before the valve is brought into contact with said seat.

In witness whereof I have hereunto set my hand this 15th day of July, 1921.

JAMES REID.

Witnesses:
H. E. CHASE,
E. A. THOMPSON.